Sept. 9, 1969 — W. E. BOWERS ET AL — 3,465,447
METHODS AND APPARATUS FOR DETERMINING DEPTH IN BOREHOLES
Filed Jan. 3, 1966 — 3 Sheets-Sheet 1

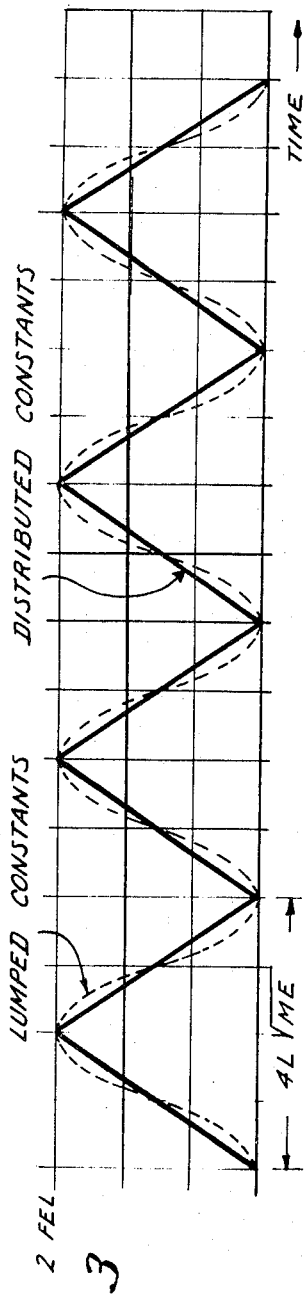
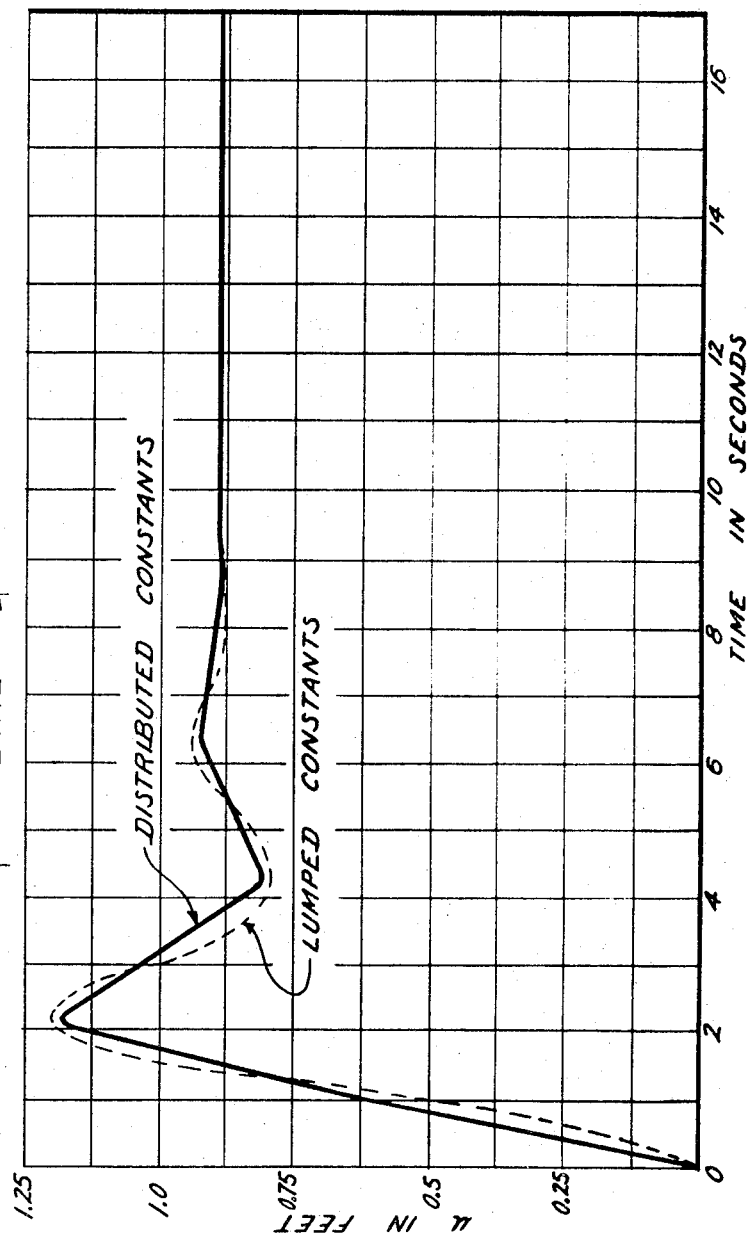

United States Patent Office 3,465,447
Patented Sept. 9, 1969

3,465,447
METHODS AND APPARATUS FOR DETERMINING DEPTH IN BOREHOLES
William E. Bowers and William A. Whitfill, Houston, Tex., assignors to Schlumberger Technology Corporation, Houston, Tex., a corporation of Texas
Filed Jan. 3, 1966, Ser. No. 518,370
Int. Cl. G01b 5/04; G01d 7/00
U.S. Cl. 33—133                                 15 Claims

ABSTRACT OF THE DISCLOSURE

Methods and apparatus for accurately and continuously determining changes in depth of a tool in a borehole are disclosed. The tension between the tool and its supporting cable is measured, as is the movement of the cable at the surface of the earth. The tension and cable movement measurements are then combined in a computer along with a plurality of constants representative of various characteristics of the cable and its surrounding medium to produce an output signal representative of the movement of the tool relating to the changes in tension. This output signal is then combined with the original cable movement measurement to produce a signal representative of the instantaneous changes in depth of the tool. This last signal can then be used for driving a recording device such that the accumulation by the recording device of this last signal will give accurate and instantaneous indications of the depth of the tool.

---

This invention relates to methods and apparatus for accurately and continuously determining the length of an elastic cable under tension and more particularly to methods and apparatus for determining instantaneous changes in depth and the true position of a tool suspended on the end of an elastic cable as the tool on the end of the cable is moved up and down.

This invention is particularly adapted for use in the logging of a borehole where measurements of the surrounding earth formations are taken at different depths along the borehole. The measurements taken along the length of the borehole are intended to provide indications of oil or gas bearing strata and therefore the depth of the logging or measuring tool below the surface of the earth must be accurately determined at all times so that the measurements taken throughout the borehole may be accurately correlated with the true depth of the logging or measuring tool. The measurements of the earth formations surrounding the borehole are generally taken as the logging or measuring tool is moved up the borehole.

To determine the depth of the logging or measuring tool in the borehole, a means of determining the length of cable that is lowered into the borehole may be utilized; that is, the actual number of feet of cable lowered into the borehole by a cable reeling device at the surface of the earth is counted. Many systems have been proposed for measuring the cable length, which gives the position of the measuring or logging tool within the borehole. Some of these are sheave devices located at the surface of the earth which provide a measurement of the length of cable which passes over the sheave. Other systems utilize a sensing device responsive to magnetic marks on the cable along the length of the cable, which system measures the length between the magnetic marks as the cable is payed out or taken in.

However, there are forces that work on the measuring or logging tool within the borehole which cause these cable length indicating devices at the surface of the earth to give inaccurate readings. Some of these forces include the weight of the measuring or logging tool and the weight of the cable which connects it to the cable reeling device at the surface of the earth, the buoyant force of the drilling liquid or mud in the borehole, and the drag or frictional forces applied by both the drilling liquid or mud and by the wall of the borehole to both the cable and the measuring or logging tool.

When investigating earth formations surrounding the borehole, the measuring or logging tool is generally lowered to the bottom of the borehole and the logging measurements are taken as the logging tool moves up the borehole. However, when the cable reeling device at the surface of the earth is stopped, the logging tool at the end of the great length of cable will continue moving downward for some distance due to the inertia of the logging tool and the cable and the elasticity of the cable. However, the depth indicating device at the surface of the earth will stop at the moment the cable reeling device is stopped. As a result, the depth indicating device at the surface of the earth will give an erroneous depth indication of the logging tool at the bottom of the borehole. In addition, when the cable is being reeled in, thus moving the measuring or logging tool up the borehole, the forces acting on the logging tool and the cable will cause the cable to stretch, thus causing the logging tool to be located at a different depth than the depth indicated on the depth indicating device at the surface of the earth.

One method for correcting for depth errors is to utilize a tension measuring device at the surface of the earth, as shown in U.S. Patent No. 3,027,649, granted to Raymond W. Sloan on Apr. 3, 1962. However, an uphole tension device can only provide an average measure of the tension encountered by the logging tool in the borehole because of the thousands of feet of cable between the logging tool and the surface of the earth. A force applied to the logging tool in the borehole would not appear immediately at the surface of the earth in the form of a change in tension because of the great length of cable, and the measured force appearing at the surface of the earth in the form of a tension measurement would be vastly distorted because of damping by the cable. The tension variations occurring at the logging tool in the borehole may be delayed by as much as several seconds from reaching the surface due to this travel time in the cable.

Moreover, a serious error may also occur if the logging tool becomes momentarily stuck against the wall of the borehole as the tool is moving through the borehole. In this instance the logging tool will be at a constant depth while at the same time the depth indicator at the surface of the earth is continually moving, thus introducing an excessive error into the indicated depth. Now, when the logging tool becomes unstuck, the elasticity of the cable will cause the logging tool to move at a great rate beyond the depth indicated by the depth indicating device at the surface of the earth and the logging tool will oscillate before reaching equilibrium. Thus it can be seen that the logging tool may have very rapid changes in depth, which depth changes may be extreme. Since these depth changes are instantaneous, a surface tension measuring device could not accurately determine these depth changes at the time that they occur.

This error introduced by the indeterminant stretching of the cable can be excessive for the accurate determination of the depth of the oil bearing strata.

When the earth strata surrounding the borehole are investigated, the location and quantity of oil sometimes cannot be determined by any one investigating method. In such cases several different investigating methods have to be utilized and the data obtained therefrom combined and analyzed before an oil bearing strata can be located. The apparatus for carrying out the different investigating methods cannot all be lowered into the borehole at the same time under existing investigating procedures. Thus, the various logging tools must sometimes be lowered into the borehole at different times.

To combine all of the various logging readings by the different investigating apparatus in such a manner as to determine the exact location of oil bearing strata, the depth indication of each logging run must correlate very accurately with one another or else the combination, analysis, and computation of the different measurements taken with the different measuring or logging tools will not provide the desired result. To combine these various logging runs in such a way that the computations taken therefrom will provide the desired information, the depth indications from the various logging runs may have to be accurate to within approximately one inch of one another. Since any instantaneous changes of depth by the logging tool could not be accurately determined by a surface tension measuring device alone, the analysis of several different logging runs could lead to inaccurate conclusions when surface tension alone is utilized for depth determinations.

One present-day example of making multiple logging runs in the same borehole concerns the automatic computation of the apparent resistivity of $R_{wn}$ of the natural occurring water within the porous formations surrounding the borehole. To obtain $R_{wn}$, a previously recorded induction log is played back in depth synchronism with a sonic log being presently run. The sonic and induction log data are continuously fed to an automatic computer to calculate the value of $R_{wa}$ and this computed $R_{wa}$ is simultaneously recorded with the sonic log. It can be seen that the depth of the sonic and induction logs must be accurate with respect to one another to obtain an accurate calculation of $R_{wa}$.

It is also desirable to have an accurate indication of the velocity of the measuring or logging device moving through the borehole. For example, when a dipmeter tool is run through the borehole to determine the dip of the adjacent earth strata, that is, the angle that the bedding plane of the earth strata differs from the horizontal, the distnce M between signal indications on different circumferential points around the borehole is obtained by moving the dipmeter across a boundary between different earth strata having different resistivity characteristics. This distance M is determined by the formula $$M = M_r \cdot \frac{V_d}{V_r}$$

where M is the actual distance between the signal indications, $M_r$ is the indicated distance between the signal indications on the recorder, $V_r$ is the velocity of the recorder at the surface of the earth, and $V_d$ is the average velocity of the dipmeter device over the interval between the indications. It can be seen that if the actual velocity of the dipmeter is different from the recorder velocity, the error in computing M will be given by the formula:

$$\frac{M - M_r}{M_r} = \frac{V_d - V_r}{V_r}$$

Thus when the actual velocity of the dipmeter tool is different from the recorder velocity, an error in the measured dip of the borehole will occur. If, however, the instantaneous depth error is corrected, the velocity depth error will also be corrected. A correction of average depth error on the other hand, would not provide a correction of velocity error.

It is an object of the invention, therefore, to provide new and improved methods and apparatus for determining the true depth of a tool within a borehole.

It is another object of the invention to provide new and improved methods and apparatus for determining the instantaneous changes in depth of a tool in a borehole.

It is another object of the invention to provide new and improved methods and apparatus for determining the instantaneous depth of a tool in a borehole.

It is still another object of the invention to provide new and improved methods and apparatus for continuously and automatically correcting a recording device at the surface of the earth to provide instantaneous values of depth of a tool in a borehole.

In accordance with one feature of the invention, methods and apparatus for determining changes in depth of a tool in a borehole comprises measuring at least a fraction of the tension in a cable at a point below the surface of the earth to produce a tension measurement and producing a measurement representative of the movement of a cable supporting a tool in a borehole. The invention further comprises combining the tension movement measurement to produce a signal indicative of the changes in the depth of the tool relating to the measured tension. This last signal can then be combined with the cable movement measurement to produce a signal indicative of the instantaneous changes in depth of a tool in a borehole.

For a better understanding of the present invention, together with other and further objects thereof, reference is had to the following description taken in connection with the accompanying drawings, the scope of the invention being pointed out in the appended claims.

Referring to the drawings:

FIGURES 3 and 4 are graphs utilized in explaining the derivation of the equations of the present invention.

Figure 1:
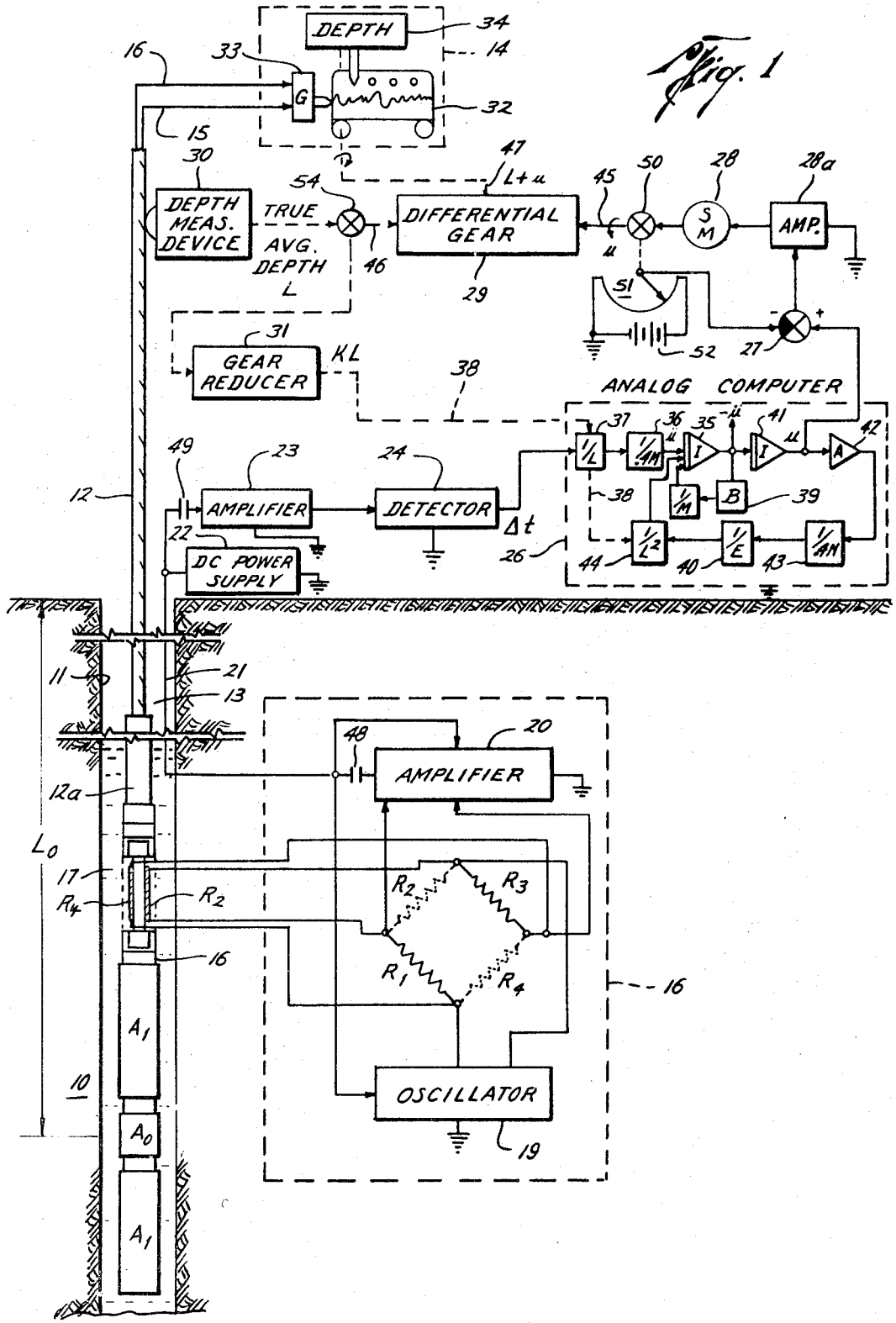
FIGURE 1 illustrates a tool in a borehole together with a schematic diagram of apparatus for correcting the depth of a tool in a borehole in accordance with the present invention.

Referring to FIGURE 1 of the drawings, there is shown a representative embodiment of apparatus constructed in accordance with the present invention for providing instantaneous corrections of the depth of a tool 10 lowered in a borehole 11 for investigation of the earth formations surrounding borehole 11. The tool 10 is a three-electrode focused electrode system wherein a survey current is emitted from central survey electrode $A_0$ and is confined to a path outward from the borehole 11 by a focusing current emitted from focusing electrodes $A_1$ on either side thereof. Thus the portion of the surrounding earth formations that is investigated at any one time is that portion which is adjacent to central survey electrodes $A_0$. Thus it can be seen that only a small vertical portion of the surrounding earth formations is investigated at any one instant of time, and thus the depth of central survey electrode $A_0$ must be accurately known before an oil bearing earth strata indicated by the logging tool 10 can be accurately penetrated. The focused electrode tool 10 shown in FIG. 1 is only an illustrative example and any type of logging tool could be utilized. The logging measurements from logging tool 10 are passed upward through armored multi-conductor cable 12 via conductors 15 and 16 to recorder 14 at the surface of the earth from the electrical circuitry contained within logging tool 10.

If now the three-electrode focused electrode tool 10 were withdrawn from the borehole after a first logging run, which log was recorded in recorder 14, and another logging run made with another type of logging tool, as for example, a sonic or induction logging tool, which second log was run concurrently with a playback of the first run log, it can be seen that the depth of the two logs must coincide exactly for the computed information obtained from both of the logs together to be useful. If the two logs are out of depth synchronism, the computations obtained from the combined logs may be erroneous and misleading.

Before any apparatus can be constructed to provide depth correction of a tool on the end of an elastic cable thousands of feet in the earth, the equation describing the motion of that tool in the borehole must first be ascertained. However, the equation describing the motion of a tool in a borehole is very complex due partly to the fact that the armored multi-conductor cable 12 is an elastic member with a distributed mass and distributed damping. A solution of this complex equation would require complex equipment to solve, thus providing a great amount of difficulty and expense. However, after a great amount of work and experimentation, a lumped constant model of a tool in a borehole has been discovered. The equation for the motion of this lumped constant model can be solved by relatively non-bulky and inexpensive equipment.

To develop a lumped constant model, the equation for the distributed case must first be developed. Even though in practice the top end of the cable would be moving at a constant velocity, for present purposes, the top end of the cable will be treated as rigid since we are interested in only the variation of the velocity of the downhole tool from the constant velocity recorder.

Considering now the actual distributed case, and neglecting the viscous drag and tool weight, the partial differential equation for this distributed case can be written as:

$$\frac{\delta^2 u}{\delta t^2} = c^2 \frac{\delta^2 u}{\delta x^2} \quad (1)$$

where $$c^2 = \frac{1}{ME}$$

and $$M = \frac{W_L}{g}$$

where $c$ = velocity of propagation of an elastic wave along the cable,
$E$ = stretch coefficient of the cable in feet per feet per pound,
$W_L$ = weight of the cable per unit length in pounds per foot,
$M$ = mass of the cable per unit length in slugs per foot,
$u$ = displacement in feet, $$\dot{u} = \frac{du}{dt}$$

$$\ddot{u} = \frac{d^2 u}{dt^2}$$

$x$ = distance along the cable from the surface in feet, and
$L$ = length of the cable in feet.

The Laplace transform of Equation 1 is:

$$\frac{d^2 \bar{u}(x, s)}{dx^2} = \left(\frac{s}{c}\right)^2 \bar{u}(x, s) - \frac{s u(x, 0)}{c^2} - \frac{\dot{u}(x, 0)}{c^2} \quad (2)$$

Assuming the system is initially at rest, boundary values can be set:

$$u(x, 0) = 0; \quad \bar{u}(0, s) = 0; \quad \dot{u}(x, 0) = 0 \quad (3)$$

If now a force F is applied at the tool end of the cable, the Laplace transform of that force can be written:

$$\frac{1}{E} \frac{d\bar{u}(L, s)}{dx} = \bar{F}(s) \quad (4)$$

Solving Equation 2 for these boundary conditions, we have:

$$\bar{u}(x, s) = D_1 e^{s/cx} + D_2 e^{-s/cx} \quad (5)$$

and $$\bar{u}(x, 0) = D_1 + D_2 = 0 \quad (6)$$

Then, from Equations 4 and 5:

$$\frac{1}{E} \frac{d\bar{u}(L, s)}{dx} = \frac{s}{Ec} (D_1 e^{s/cL} - D_2 e^{-s/cL}) = \bar{F}(s) \quad (7)$$

From Equations 6 and 7, we can write:

$$D_1 = -D_2 = \frac{\bar{F}(s) Ec}{2s \left(\cosh \frac{s}{c} L\right)} \quad (8)$$

Therefore, we can write:

$$\bar{u}(x, s) = \bar{F}(s) Ec \left[\frac{\sinh \frac{s}{c} x}{s \left(\cosh \frac{s}{c} L\right)}\right] \quad (9)$$

If a step force of magnitude F is applied, then the transform of displacement $u$ at $x = L$ is:

$$\bar{u}(L, s) = FEcs^{1/2} \tanh \frac{s}{c} L \quad (10)$$

Taking the inverse Laplace transform of Equation 10, we have:

$$u(L, t) = FEc \left[H\left(\frac{2L}{c}, t\right)\right] \quad (11)$$

where $$H\left(\frac{2L}{c}, t\right)$$

is the triangular wave function as described by:

$$H\left(\frac{2L}{c}, t\right) = t \text{ when } 0 < t < \frac{2L}{c} \text{ and } H\left(\frac{2L}{c}, t\right) = \frac{4L}{c} - t \text{ when } \frac{2L}{c} < t < \frac{4L}{c} \text{ and } H\left(\frac{2L}{c}, t + \frac{4L}{c}\right) = H\left(\frac{2L}{c}, t\right) \quad (12)$$

The period of this function is:

$$\frac{4L}{c} = 4L\sqrt{ME} = \text{four way travel time} \quad (13)$$

The distributed constant case just solved has neglected the effects of viscous drag on the cable and viscous drag on the tool at the end of the cable. If these factors are added to the problem, the solution is quite complex and difficult to manipulate to determining tension, velocity and depth error; and, therefore, as stated before, it is desirable to use a simpler model of the system.

It would be desirable to determine how closely the response of a lumped constant system will approach the distributed constant sysctem, if both systems have the same natural resonant frequency. The resonant frequencies can be written as:

$$f_{n1} = \frac{1}{2\pi\sqrt{M'E'}}; \quad f_{n2} = \frac{1}{4\sqrt{MEL^2}} \quad (14)$$

where $f_{n1}$ is the natural frequency of the lumped constant system, $f_{n2}$ the natural frequency of the distributed constant system, $M'$ the total lumped mass, and $E'$ the total effective stretch coefficient. E and M are on a per unit length basis as defined previously. Equating the natural resonant frequencies of the two systems, we have:

$$\frac{1}{2\pi\sqrt{M'E'}} = \frac{1}{4\sqrt{MEL^2}} \quad (15)$$

Thus, $$M'E' = \frac{4}{\pi^2} MEL^2 \quad (16)$$

If we make $E' = EL$ so that the steady state value of the depth error $u$ will be the same in both the distributed and lumped constant systems, then to satisfy Equation 16, we have:

$$M' = \frac{4}{\pi^2} \approx .4 \, ML \quad (17)$$

Therefore if .4 of the total weight of the given length of cable is lumped on the end of a spring which has the same total spring constant $1/EL$ that the cable itself would have at this given length, the natural frequency of the lumped constant system will be identical to the natural frequency of the distributed constant system.

To determine if the lumped constant system will approximate the distributed constant system, the curves of the two systems with equal natural frequencies will be plotted. The differential equation of the lumped constant system with a force F applied at the tool can be written as:

$$.4 ML \frac{d^2x}{dt^2} + \frac{1}{EL} x = F \qquad (18)$$

Taking the Laplace transform of Equation 18, we have:

$$\left(.4 MLs^2 + \frac{1}{EL}\right)\bar{x} = \bar{F} \qquad (19)$$

For a step force of magnitude F applied at time $t=0$, we can write:

$$\bar{x} = \frac{F}{s\left(.4MLs^2 + \frac{1}{EL}\right)} \qquad (20)$$

Thus, taking the inverse Laplace transform, we have:

$$x(t) = FEL\left[1 - \cos\sqrt{\frac{1}{.4MEL^2}}t\right] \qquad (21)$$

Looking now at FIG. 3, there is shown a plot of the lumped constant system of Equation 21 and the distributed constant system of Equation 11. The plot of the lumped constant system is shown as a dotted line and the plot of the distributed constant system is shown as a solid line. It can be seen that both systems are very similar except for the very small difference caused by the fact that the distributed constant system is a triangular wave shape and the lumped constant system is a sinusoidal wave shape.

However, in the FIG. 3 plot, the weight attached to the end of the cable, the viscous damping applied to the cable, and the viscous damping applied to the tool have all been neglected in order to make the correlation simple. However, all of these factors affect the motion of the tool on the end of the cable. To determine the correlation of the lumped constant case with the distributed constant case, the equation for the lumped constant case with damping was plotted against a curve of the results of a digital computer solution of the distributed constant case with damping.

The equation of motion for the lumped constant system can be written as:

$$(.4ML + M_0)\ddot{x} + (.4BL + B_0)\dot{x} + \frac{1}{EL}x = F \qquad (22)$$

where $M_0$ is the mass of the tool, B is the viscous damping on the cable, and $B_0$ is the viscous damping on the tool. Other parameters have been previously defined.

Referring to FIG. 4, there is shown a plot of $x$ versus time for a typical case with $M=10$ slugs per 1,000 feet, $B=6.25$ lb. sec./ft./1,000 ft., $1/E=1,250$ lb./ft./1,000 feet, $M_0=4$ slugs, $B_0=25$ lb. sec./feet, $L=11,180$ feet and $F=100$ lbs. The curve of the lumped constant system of Equation 22 is represented in FIG. 4 as a dotted line. The distributed constant system is represented in FIG. 4 as a solid line. From FIG. 4 it can be seen that the two curves representing the distributed and lumped constant systems are very similar, the maximum error being in the order of .025 foot. The resonant frequencies of both systems are the same. Thus, it can be seen that the lumped constant system is sufficiently close to the distributed constant system that a lumped constant system satisfying Equation 22 can be directly substituted for the distributed constant system.

If now the force at the logging device is known, the motion of the logging tool with respect to the surface can be determined to within .025 foot by solving a second-order linear differential equation with constant coefficients.

However, the force applied to the logging tool cannot be measured directly. But if the tension between the cable and the logging tool is known, the depth error correction can be made. If a tension device is located between the cable and the logging tool, the mass $M_0$ and viscous drag $B_0$ of the logging tool can be neglected. In terms of tension from the tension device located between the logging tool and the end of the cable, the equation of motion of the end of the cable is:

$$.4ML\ddot{u} + .4BL\dot{u} + \frac{1}{EL}u = \Delta t \qquad (23)$$

where $\Delta t$ is the change in tension from a reference tension, registered by a tension device located between the bottom of the cable 12 and the logging tool 10 and $u$ is the depth error due to that change in tension.

Looking now at FIG. 1, there is shown the apparatus for determining the tension between the cable 12 and the logging tool 10, transmitting a signal representative of this tension to the surface of the earth, computing the depth error $u$, and correcting the depth drive to the recorder.

The depth correction downhole circuitry is contained within a fluid-tight housing unit 16 within the head of the logging device 10. The electrical schematic of the downhole depth correction circuitry is shown contained within dotted line enclosure 16, which corresponds to the fluid-tight housing unit 16. There is shown the tension device 17 located in the top portion of the logging tool 10. Tension device 17 has two semi-conductor strain-gage elements $R_2$ and $R_4$. The resistances of semi-conductor strain-gage elements $R_2$ and $R_4$ will vary as the tension between logging tool 10 and cable 12 varies. Shown within the housing unit 16 is a bridge circuit 18, comprising resistor elements $R_1$ and $R_3$ and semi-conductor strain-gage elements $R_2$ and $R_4$, represented as dotted lines in bridge circuit 18. Resistance elements $R_1$ and $R_3$ are non-strain-gage type gages, used for temperature and linearity compensation. An oscillator 19 is shown connected to the junction between resistor element $R_3$ and semi-conductor strain-gage element $R_2$ and the junction between resistor element $R_1$ and semi-conductor strain-gage element $R_4$. The input to a downhole amplifier 20 is connected between the junction between resistor element $R_3$ and semi-conductor strain-gage element $R_4$ and the junction between resistor element $R_1$ and semi-conductor strain-gage element $R_2$.

The DC power input to oscillator 19 and amplifier 20 is supplied by way of conductor 21 through armored multi-conductor cable 12 from DC power supply 22 at the surface of the earth. The output from downhole amplifier 20 is connected to conductor 21 through a DC blocking capacitor 48, located within downhole housing unit 16. Conductor 21 is shown separate from armored multi-conductor cable 12 for purposes of clarity of the electrical schematic portion of FIG. 1, but is actually located therein. The input to an amplifier 23 at the surface of the earth is supplied through a DC blocking capacitor 49 from conductor 21. One output from amplifier 23 is connected to the input of a detector 24. The output of detector 24 is connected to the input of an analog computer 26. The output from analog computer 26 is connected to a junction point 27. The output from junction point 27 is connected to an amplifier 28a and servo motor 28b. The mechanical output of servo motor 28b is supplied through a junction point 50 to a differential gear 29. Junction point 50 also supplies the mechanical output of servo motor 28b to rotate the wiper arm of potentiometer 51. A battery 52 having a grounded negative terminal is connected across the resistance portion of potentiometer 51. The wiper arm of potentiometer 51 is electrically connected to a negative junction of junction point 27 thus providing a negative feedback to amplifier 28a.

There is also shown in FIG. 1 a depth measuring device 30 which determines the true average depth of tool 10 within the borehole and provides a mechanical rotational output to junction point 54 indicative of the movement of the cable 12 in and out of the borehole. This rotational input to junction point 54 is indicative of the true average depth of tool 10 within the borehole. The rotational outputs from junction point 54 are connected to the input of the differential gear 29 by a shaft 46 and to a gear 31. The mechanical rotational output of gear reducer 31 is connected to portions of analog computer 26 by shaft 38, the purpose of this mechanical connection to be explained in further detail later.

The mechanical rotational output from differential gear 29 is connected to recorder 14 by shaft 47. Shaft 47 is shown rotatively connected to chart 32 within recorder 14 to move chart 32 as shaft 47 rotates. The logging readings supplied via conductors 15 and 16 to galvonometer unit 33 within recorder 14 are recorded on chart 32. Shaft 47 is also connected to a depth indicating mechanism 34 which places a mark on chart 32 at set intervals of depth as determined by the rotation of shaft 47.

Now concerning the operation of the depth correction system of FIG. 1, the semi-conductor strain-gage elements $R_2$ and $R_4$ of tension device 17 will vary in resistance as the tension between logging device 10 and cable 12 varies. Oscillator 19, which supplies a constant voltage output at a constant frequency, supplies the power to bridge circuit 18. The output voltage from bridge circuit 18 to amplifier 20 will vary as the resistance of semi-conductor strain-gage elements $R_2$ and $R_4$ vary. By having two semi-conductor strain-gage elements, the output to amplifier 20 will have twice the magnitude, as compared with just one semi-conductor strain-gage element. Thus, the output amplitude from amplifier 20 will vary in proportion to the tension registered by tension device 17.

The DC power for oscillator 19 and amplifier 20 is supplied over the same conductor, i.e., conductor 21, that carries the output signal from amplifier 20 within housing unit 16 to amplifier 23 at the surface of the earth. Capacitors 48 and 49 filter the DC from amplifiers 20 and 23. Thus, it is possible by this means to use only one conductor for the downhole tension measurement, thus saving space within multi-conductor cable 12 where space is at a premium.

After amplification by amplifier 23, the downhole tension signal is applied to detector 24. The output of detector 24 provides a DC voltage proportional to downhole tension which is fed to analog computer 26.

Before proceeding with the discussion of the depth correction to be made by analog computer 26, it would be helpful at this time to discuss the basis for the depth corrections to be made. The mechanical rotational output from depth measuring device 30 is assumed to be an accurate representation of average depth taking into account average values of cable stretch as determined by known methods, as for example, that shown in U.S. Patent No. 3,067,519, granted to G. Swift on Dec. 11, 1962, of U.S. Patent No. 3,027,649, granted to R. W. Sloan on Apr. 3, 1962. This true average depth indication is supplied to junction point 54 which provides rotational outputs to differential gear 29 and gear 31. However, this true average depth indication does not provide for depth errors caused by erratic motion of the tool 10, as for example when it becomes caught on the sides of the borehole 11. A tension created by such erratic tool motion is substantially delayed from reaching the surface of the earth due to the great length of cable 12 between the tool 10 and the surface of the earth. In addition, the tension on the cable at the tool caused by such erratic tool motion is vastly distorted before reaching the surface of the earth due to the damping of the cable. Thus, the need is seen for adding a function to the true average depth output from depth measuring device 30, which function represents erratic tool motion.

Before a logging run into the borehole 11, the output of detector 24 is set at zero volts with the cable 12 and tool 10 lowered into the borehole 11 in the drilling mud 13 under steady state conditions, i.e., no forces acting on the cable 12 or tool 10 other than their own weight and the buoyant force of drilling mud 13. Therefore, the output from detector 24 is a DC voltage representing the change in downhole tension from this steady state condition and thus represents instantaneous depth changes caused by erratic tool motion.

Analog computer 26 must be adapted to solve Equation 23 and provide an output voltage indicative of the depth error $u$. To solve Equation 23, a signal indicative of the second derivative $\ddot{u}$ of the depth error $u$ must be applied to a series of integrating circuits to obtain the rate of change of depth error $\dot{u}$ and the depth error $u$. Therefore, we must solve for the second derivative $\ddot{u}$ of depth error $u$ from Equation 23. Rearranging Equation 23, we have:

$$\ddot{u} = \frac{\Delta t}{.4ML} - \frac{B\dot{u}}{M} - \frac{u}{.4ML^2E} \qquad (24)$$

Looking now at analog computer 26, the input to an integrator 35 will be considered as the second derivative $\ddot{u}$ of the depth error $u$. Looking at Equation 24, it can be seen that we must apply three inputs to integrator 35 corresponding to the $\Delta t$, $\dot{u}$, $u$ terms of Equation 24. Looking at Equation 24, it can be seen that $\Delta t$ is divided by $.4ML$. The $1/.4M$ is obtained from an element 36 which could, for example, be a fixed resistor.

Since the length L varies as the tool 10 is raised and lowered in borehole 11, we must provide a means for varying the length L term in Equation 24. Thus, there is a mechanical rotational connection from junction point 24 through gear reducer 31 to analog computer 26. This mechanical connection is connected to an element 37 within analog computer 26 by shaft 38, which element could for example, comprise a variable resistor driven from shaft 38, to provide the $1/L$ term of the $\Delta t$ portion of Equation 24. Thus, it can be seen that the output $\Delta t$ of detector 24 is multiplied by $1/.4ML$ and thus, the input to integrator 35 from detector 24 is $\Delta t/.4ML$. Since the input to integrator 35 is the second derivative $\ddot{u}$ of the depth error $u$, integrator 35 takes the integral of the second derivative $\ddot{u}$ of the depth error $u$ and provides a negative output indicative of the first derivative $\dot{u}$ of the depth error $u$.

Looking again at Equation 24, it is seen that the first derivative $\dot{u}$ of the depth error $u$ is multiplied by the constant $B/M$. B, the damping coefficient, varies as a function of mud viscosity which is constant for a given borehole, but which varies from borehole to borehole. Thus, B would be set for a given borehole and then left at that constant value. A variable element 39, which could comprise, for example, a variable resistor, provides this function. In addition a fixed constant element proportional to $1/M$ which could comprise, for example, a fixed resistor, is placed in the $-\dot{u}$ feedback path. Thus, it can be seen that the output $-\dot{u}$ of integrator 35 is multiplied by a constant $B/M$ and fed back to the input of integrator 35 to provide the second term of Equation 24.

The output $-\dot{u}$ of integrator 35 is also applied to an integrator 41 which provides an output indicative of the depth error $u$. An output of integrator 41 is applied to an amplifier 42 to provide a value of $-u$ of the depth error $u$. Looking at Equation 24, it can be seen that the depth error $u$ is multiplied by a term equal to $1/.4ML^2E$. The $1/.4M$ term is provided by a fixed constant element 43 which could comprise, for example, a fixed resistor. Since the stretch coefficient E of the cable differs for different types of cables, a variable element 40, which could comprise, for example, a variable resistor, is provided to supply the $1/E$ term to $-u$. Since the length L varies as the logging device is lowered into the borehole, the shaft 38 from gear 31 is connected to a variable element 44 representing $1/L^2$, which element could comprise, for example, a potentiometer having its wiper arm driven by shaft 38. The resistance portion of this potentiometer would vary as the inverse of the square to provide the $1/L^2$ term. The output from variable element 44 is applied to the input of integrator 35 thus feeding back a term equal to $-u/.4ML^2E$ to integrator 35.

Thus it can be seen that the $\Delta t$, $\dot{u}$ and $u$ terms of Equation 24 are supplied to the input of integrator 35, which terms equal the right side of the equal sign of Equation 24. Thus, the input to integrator 35 equals the second derivative $\ddot{u}$ of the depth error $u$. Thus the output of integrator 35 is indicative of the first derivative $\dot{u}$ and the output of integrator 41 is indicative of the depth error $u$.

The depth error $u$ output from integrator 41 is supplied to junction point 27 and then to amplifier 28a. Servo motor 28b provides a mechanical output to junction point 50 proportional to the signal supplied from junction point 27. One mechanical rotational output from junction point 50 is used to drive the wiper arm of potentiometer 51. The voltage on the wiper arm of potentiometer 51 which depends on the point on the resistance portion of potentiometer 51 which the wiper arm is contracting, is thus proportional to the position of shaft 45 which is connected to differential gear 29. This signal from the wiper arm of potentiometer 51 is subtracted by junction point 27 from the signal which is supplied to junction point 27 from analog computer 26 and the resultant signal is supplied to amplifier 28a. Thus it can be seen that servo motor 28b provides a mechanical output through junction point 50 to shaft 45 as long as there is a signal applied to amplifier 28a from junction point 27. The position of shaft 45 will at all times be substantially equal to the depth error $u$ as calculated by analog computer 26.

The differential gear 29 adds the rotation of shafts 45 and 46 representing the depth error $u$ and the true average depth $L$ respectively, and provides a rotational output to recorder 14 on shaft 47, which rotation is equal to the sum of $L+u$. This value of $L+u$ provides the corrected depth indication to chart 32 of recorder 14. Shaft 47 is also connected to depth indicator 34 which provides depth indications on chart 32 at given intervals. The logging readings supplied by conductors 15 and 16 through armored multi-conductor cable 12 from the logging tool 10 within the borehole, are supplied to galvanometer unit 33 which provides visual markings on chart 32 indicative of the logging readings. Thus it can be seen that the logging readings provided by galvanometer unit 33 can be correlated with the true depth markings as provided by depth indicator 34.

Figure 2:
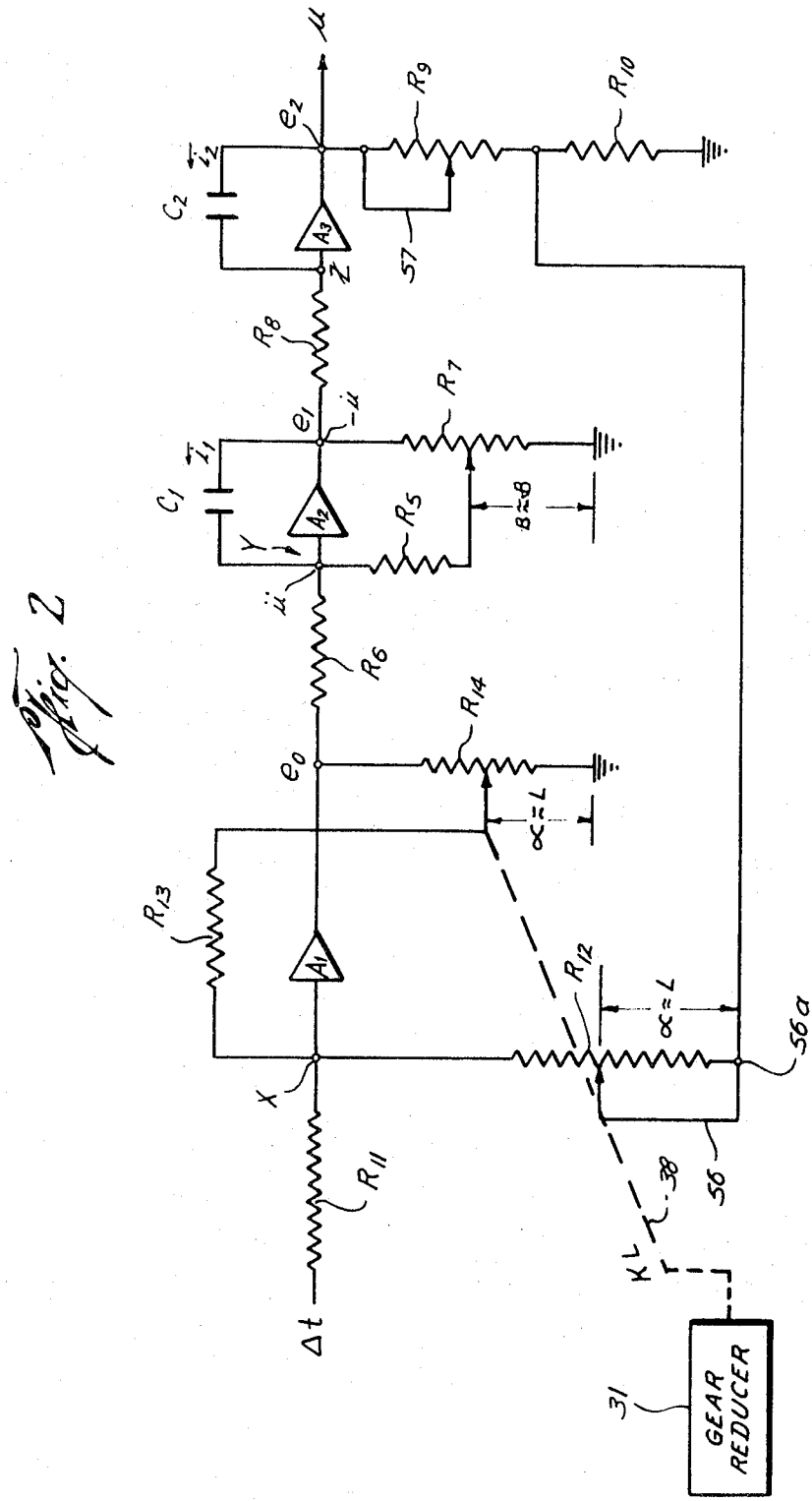
FIGURE 2 illustrates another embodiment of an analog computer circuit utilized in the depth correcting apparatus of the present invention.

Referring now to FIG. 2, there is shown another analog computer circuit that can be utilized in place of the analog computer shown in FIG. 1. The analog computer circuit of FIG. 2 incorporates an improved design of an analog computer that may be utilized in the FIG. 1 embodiment of the present invention. This analog computer circuit of FIG. 2 alleviates the necessity of using potentiometers that vary as the inverse of the length $L$ and the inverse of the length squared $L^2$. The analog computer circuit of FIG. 2 utilizes potentiometers which vary directly as the length $L$. These potentiometers are designated $R_{12}$ and $R_{14}$ in FIG. 2.

The output of detector 24 is connected to a fixed resistor $R_{11}$, the other side of which is connected to a point X. The point X is connected to high input impedance amplifier, whose output is connected to one side of the resistance portion of a potentiometer $R_{14}$, the other side of the resistance portion of potentiometer $R_{14}$ being connected to ground. The wiper arm of potentiometer $R_{14}$ is connected through a fixed resistor $R_{13}$ back to point X. The output of amplifier $A_1$ is also connected through a fixed resistor $R_6$ to a point Y. The point Y is connected to a high input impedance amplifier $A_2$. The output of amplifier $A_2$ is connected to the side of the resistance portion of a potentiometer $R_7$, the other side of the resistance portion of $R_7$ being connected to ground. The wiper arm of potentiometer $R_7$ is connected through a fixed resistor $R_5$ back to the point Y. The output of amplifier $A_2$ is also connected through a capacitor $C_1$ back to the point Y.

The output of amplifier $A_2$ is also connected through a fixed resistor $R_8$ to a point Z. The point Z is connected to the input of a high input impedance amplifier $A_3$, the output of which is connected through a voltage dividing network comprising potentiometer $R_9$ and resistor $R_{10}$ to ground. The output of amplifier $A_3$ is also connected to a wiper arm 57 of potentiometer $R_9$. The junction point between the resistance portion of $R_9$ and resistor $R_{10}$ is connected to a first side of the resistance portion of a potentiometer $R_{12}$, the other side of the resistance portion of potentiometer $R_{12}$ being connected to the point X. The first side of potentiometer $R_{12}$ is also connected to a wiper arm 56 of potentiometer $R_{12}$. The output of amplifier $A_3$ is also connected through a capacitor $C_2$ back to the point Z. The output of amplifier $A_3$ is also connected to junction point 27 of FIG. 1. The wiper arm of potentiometer $R_{14}$ and the wiper arm 56 of potentiometer $R_{12}$ are connected to the common shaft 38 which is connected to gear reducer 31 of FIG. 1. Thus, the wiper arm of potentiometer $R_{14}$ and the wiper arm 56 of potentiometer $R_{12}$ rotate across the resistance portions of potentiometers $R_{12}$ and $R_{14}$ with the rotation of shaft 38.

By setting $$\frac{1}{.4ML^2E} = \frac{kR_{13}}{\alpha^2 R_{12}}, \frac{R_{13}}{\alpha R_{11}} = \frac{1}{.4ML}$$

and $$\frac{B}{M} = \frac{\beta}{R_5 C_1}$$

we can solve Equation 24 by the analog computer circuit of FIG. 2. That portion of potentiometer $R_7$ between ground and the wiper arm of potentiometer $R_7$, designated $\beta$, is set proportional to the damping coefficient B. By varying the wiper arm of potentiometer $R_9$ (shown as wiper arm 57), the stretch coefficient E of cable 12 can be varied for a given cable. That portion of potentiometer $R_{12}$ between wiper arm 56 and the bottom side 56a of potentiometer $R_{12}$ and that portion of potentiometer $R_{14}$ between ground and the wiper arm of potentiometer $R_{14}$ is proportional to the length L between the surface of the earth and the total 10. This length L is continuously supplied to potentiometers $R_{12}$ and $R_{14}$ by shaft 38.

The input of amplifier $A_2$ is proportional to the second derivative $\ddot{u}$ of the depth error $u$, the output from amplifier $A_2$ is proportional to the first derivative $\dot{u}$ of the depth error $u$, and the output from amplifier $A_3$ is proportional to the depth error $u$. The output of amplifier $A_3$ is supplied to junction point 27 of FIG. 1 in the same manner as the analog computer circuit 26 of FIG. 1. Since the feedback path to the input of amplifier $A_1$ of the depth error $u$ is through voltage dividing network comprising resistors $R_9$ and $R_{10}$, the fed back signal will be equal to $ku$ where $$k = \frac{R_{10}}{R_9 + R_{10}}$$

For a further discussion of the derivation of these relationships concerning the analog computer circuit of FIG. 2, see co-pending application Ser. No. 518,415 by William A. Whitfill, filed on Jan. 3, 1966.

It can now be seen that by means of the apparatus of the present invention, the depth error $u$ can be determined at all times and the recording equipment at the surface of the earth can be continuously corrected to provide an indication of the actual instantaneous depth of the logging tool in the borehole by providing indications of the downhole tension to computing and correcting apparatus at the surface of the earth. Thus, the error in correcting erratic tool motion using uphole tension due to distortion and delay caused by the tension at the logging tool traveling through thousands of feet of cable will be corrected. Therefore, the exact depth of oil bearing strata can be accurately determined, and the correlation of two or more logging runs can now be made very accurate to provide data for determining where oil bearing strata are located along with accurate determinations of the amount of oil in those oil bearing stratas. It is to be understood that a tension device could alternatively be located between two segments of the cable rather than between the cable and tool and still be within the scope of the invention, although the accuracy may be less as the distance from the tool increases. In this case, the length L of Equation 24 would be considered from the tension device to the surface rather than from the tool to the surface.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a borehole tool depth measuring system having a cable supported well tool, the combination comprising:
 (a) first means supported by said cable for measuring at least a fraction of the tension in said cable at a point in the vicinity of the tool to produce a tension signal;
 (b) second means for generating a first signal representative of the movement of a cable at the surface of the earth; and
 (c) third means responsive to the tension signal and the first signal for generating a second signal indicative of the changes in the depth of a tool relating to the measured tension.

2. The apparatus of claim 1 wherein the third means provides the second signal $u$ in response to the first signal L and the tension signal $\Delta T$ according to the relationship:

$$u = EL\Delta T - c_1 BEL^2 \frac{du}{dt} - c_2 EML^2 \frac{d^2u}{dt^2}$$

where E is the stretch coefficient of the cable, M is the mass of the cable, B is the damping coefficient, $c_1$ and $c_2$ are constants, and $t$ is time.

3. The apparatus of claim 1 wherein the tension measuring means includes a tension measuring device located between a cable and a tool for measuring the exerted tensile force therebetween.

4. The apparatus of claim 1 and further including:
 (d) means responsive to the first and second signals for generating a third signal representative of the instantaneous changes in depth of a tool in a borehole.

5. The apparatus of claim 1 wherein the first means includes:
 (1) a strain-gage positioned at a desired position on a cable below the surface of the earth;
 (2) means for energizing the strain-gage for generating the tension signal in response to the tensile force exerted on the strain-gage.

6. The apparatus of claim 4 wherein the tension measuring means includes a device for measuring the tensile force exerted between a cable and a tool and the third means provides the second signal $u$ in response to the first signal L and the tension signal $\Delta T$ according to the relationship:

$$u = EL\Delta T - .4BEL^2 \frac{du}{dt} - .4EML^2 \frac{d^2u}{dt^2}$$

where E is the stretch coefficient of the cable, M is the mass of the cable, B is the damping coefficient, and $t$ is time.

7. A method for determining the changes in depth of a tool on the end of a cable in a borehole, comprising:
 (a) measuring at least a fraction of the tension in a cable at a point in the vicinity of a tool to produce a tension measurement;
 (b) generating a first signal representative of the movement of a cable at the surface of the earth; and
 (c) generating a second signal in response to the tension measurement and the first signal and indicative of the changes in the depth of the tool in the borehole relating to the measured tension.

8. The method of claim 7 wherein the second signal $u$ is generated in response to the tension measurement $\Delta T$ and the first signal L according to the relationship:

$$u = EL\Delta T - c_1 BEL^2 \frac{du}{dt} - c_2 EML^2 \frac{d^2u}{dt^2}$$

where E is the stretch coefficient of the cable, M is the mass of the cable, B is the damping coefficient, $c_1$ and $c_2$ are constants, and $t$ is time.

9. The method of claim 7 wherein the step of measuring tension includes measuring the tension between a cable and a tool.

10. The method of claim 7 and further including:
 (d) generating a third signal representative of the instantaneous changes in depth of a tool in a borehole in response to the first and second signals.

11. The method of claim 10 wherein the step of measuring tension comprises measuring the tensile force exerted between a cable and a tool and the second signal $u$ is generated in response to the tension signal $\Delta T$ and the first signal L according to the relationship:

$$u = EL\Delta T - .4BEL^2 \frac{du}{dt} - .4EML^2 \frac{d^2u}{dt^2}$$

where E is the stretch coefficient of the cable, M is the mass of the cable, B is the damping coefficient, and $t$ is time.

12. Apparatus for determining the changes in depth of a tool in a borehole, comprising:
 means supported by a cable for measuring at least a fraction of the tension on a cable at a point in the vicinity of a borehole tool to produce a tension measurement;
 means responsive to the movement of a cable at the surface of the earth for producing a cable movement measurement; and
 means for combining said tension and cable movement measurements to produce a signal indicative of the instantaneous changes in depth of a tool in a borehole whereby the accumulation of said instantaneous depth changes will give the true position of a tool in a borehole.

13. Apparatus for driving a recording device as a function of the movement of a tool in a borehole, comprising:
 means supported by a cable for measuring at least a fraction of the tension on said cable at a point in the vicinity of a borehole tool to produce a tension measurement;
 means responsive to the movement of said cable at the surface of the earth for producing a cable movement measurement; and
 means for combining said tension and cable movement measurments to produce a signal for driving a recording device as a function of the instantaneous changes in depth of a tool in a borehole whereby the accumulation of said instantaneous depth changes by a recording device will give the true instantaneous depth of a tool in a borehole.

14. A method of determining the changes in depth of a tool in a borehole, comprising:
 (a) measuring at least a fraction of the tension on a cable at a point in the vicinity of a borehole tool to produce a tension measurement;

(b) producing a cable movement measurement in response to the movement of a cable at the surface of the earth; and (c) combining said tension and cable movement measurements to provide an indication of the instantaneous changes in depth of a tool in a borehole whereby the accumulation of said instantaneous depth changes will give the true position of a tool in a borehole.

15. A method of driving a recording device as a function of the movement of a tool in a borehole, comprising:

(a) measuring at least a fraction of the tension on a cable at a point in the vicinity of a borehole tool to produce a tension measurement;

(b) producing a cable movement measurement in response to the movement of a cable at the surface of the earth; and (c) combining said tension and cable movement measurements to produce a signal for driving a recording device as a function of the instantaneous changes in depth of a tool in a borehole whereby the accumulation of said instantaneous depth changes by a recording device will give the true depth of a tool in a borehole.

References Cited

UNITED STATES PATENTS

| | | | |
|---|---|---|---|
| 3,027,649 | 4/1962 | Sloan. | |
| 2,934,695 | 4/1960 | Maulsby | 324—34 |
| 2,794,951 | 6/1957 | Broding et al. | 324—34 |

LEONARD FORMAN, Primary Examiner

E. J. D'AMBROSIO, Assistant Examiner

U.S. Cl. X.R.

33—129; 324—1